(12) United States Patent
Li et al.

(10) Patent No.: US 9,554,394 B2
(45) Date of Patent: Jan. 24, 2017

(54) UPLINK MU-MIMO METHOD AND SYSTEM

(71) Applicant: HUAWEI TECHNOLOGIES CO., LTD., Shenzhen, Guangdong (CN)

(72) Inventors: Yue Li, Shenzhen (CN); Jianguo Wang, Bonn (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 14/724,953

(22) Filed: May 29, 2015

(65) Prior Publication Data

US 2015/0264700 A1    Sep. 17, 2015

Related U.S. Application Data

(63) Continuation of application No. PCT/CN2012/085580, filed on Nov. 29, 2012.

(51) Int. Cl.
| | |
|---|---|
| *H04W 72/12* | (2009.01) |
| *H04W 4/00* | (2009.01) |
| *H04B 7/04* | (2006.01) |
| *H04L 25/03* | (2006.01) |
| *H04L 1/18* | (2006.01) |
| *H04B 7/06* | (2006.01) |

(52) U.S. Cl.
CPC ............ *H04W 72/12* (2013.01); *H04B 7/0452* (2013.01); *H04B 7/0456* (2013.01); *H04L 1/1887* (2013.01); *H04L 25/0391* (2013.01); *H04W 4/008* (2013.01); *H04B 7/0404* (2013.01); *H04B 7/0634* (2013.01); *H04L 1/1896* (2013.01)

(58) Field of Classification Search
CPC .. H04L 25/0391; H04L 1/1887; H04L 1/1896; H04B 7/0452; H04B 7/0456; H04B 7/0404; H04B 7/0634; H04W 72/12; H04W 4/008
See application file for complete search history.

(56) References Cited

U.S. PATENT DOCUMENTS

| | | | |
|---|---|---|---|
| 2008/0095268 | A1 | 4/2008 | Aldana |
| 2011/0026622 | A1 | 2/2011 | Luo et al. |
| (Continued) | | | |

FOREIGN PATENT DOCUMENTS

| | | |
|---|---|---|
| CN | 101252417 A | 8/2008 |
| CN | 102498689 A | 6/2012 |

*Primary Examiner* — Brian D Nguyen
(74) *Attorney, Agent, or Firm* — Leydig, Voit & Mayer, Ltd.

(57) ABSTRACT

The present invention provides an uplink MU-MIMO method. The method includes: sending, by a user equipment, a sounding reference signal to a base station, so that the base station constructs a precoding matrix according to the sounding reference signal, and generates a first scheduling message according to the precoding matrix; receiving the first scheduling message sent by the base station, where the first scheduling message includes a layer mapping rule and the precoding matrix; generating at least one MAC packet data unit MAC PDU according to the first scheduling message, and sending the MAC PDU, so that multiple user equipments exchange the MAC PDUs; generating an uplink signal after the MAC PDU is processed in various layers; and sending, by using an antenna, the uplink signal to the base station. The present invention greatly improves uplink spectral efficiency of a system.

19 Claims, 8 Drawing Sheets

(56) References Cited

U.S. PATENT DOCUMENTS

| | | | |
|---|---|---|---|
| 2011/0134774 A1* | 6/2011 | Pelletier | H04W 52/365 370/252 |
| 2012/0002743 A1 | 1/2012 | Cavalcante et al. | |
| 2012/0127948 A1* | 5/2012 | Chung | H04L 5/0053 370/329 |
| 2012/0307767 A1* | 12/2012 | Yamada | H04W 74/02 370/329 |
| 2013/0046968 A1* | 2/2013 | Dinan | H04L 9/0637 713/150 |
| 2013/0077514 A1* | 3/2013 | Dinan | H04L 5/0057 370/252 |
| 2013/0213195 A1* | 8/2013 | Czympiel | B25B 23/1425 81/467 |
| 2014/0105159 A1 | 4/2014 | Kim | |

\* cited by examiner

UPLINK MU-MIMO METHOD AND SYSTEM

CROSS-REFERENCE TO RELATED APPLICATIONS

This application is a continuation of International Patent Application No. PCT/CN2012/085580, filed on Nov. 29, 2012, which is hereby incorporated by reference in its entirety.

TECHNICAL FIELD

The present invention relates to the field of wireless communications technologies, and in particular, to an uplink MU-MIMO method and system.

BACKGROUND

With the rapid development of mobile communications technologies, mobile communications systems in multiple standards have emerged, such as, Global System for Mobile Communications (GSM) networks, General Packet Radio Service (GPRS) networks, Wideband Code Division Multiple Access (WCDMA) networks, CDMA-2000 networks, Time Division-Synchronous Code Division Multiple Access (TD-SCDMA) networks, and Worldwide Interoperability for Microwave Access (WiMAX) networks. Besides providing voice communications services, generally, these mobile communications systems further provide data communications services; therefore, a user may use the data communications services provided by these mobile communications systems to upload and download various types of data.

At present, there are two types of methods for uploading and downloading data with a data communications service provided by an existing mobile communications system:

in one aspect, in a method for a single user equipment (UE), even though other enhanced communication means are used to improve reliability and/or a throughput rate of data transmission of the user equipment, for example, coordinated multipoint transmission (CoMP) is used to improve reliability of a user equipment at a cell edge, or carrier aggregation (CA) is used to improve a throughput rate of a user, the method has the disadvantage that, once an environment of the user equipment gets worse, the throughput rate and/or the reliability of data transmission of the user equipment will decrease dramatically;

in another aspect, in a method for two user equipments, to solve the foregoing problem, a concept of synthetic communications is put forward, and in synthetic communications, both uplink and downlink data may be forwarded by other user equipments; communication between the user equipments may be implemented by using short-distance technologies, such as WIFI and Bluetooth, and may also be implemented by using Long Term Evolution D2D (LTE D2D); a manner of uplink multi-user multiple-input multiple-output (MU-MIMO) in an LTE system is virtual multiple-input multiple-output (virtual-MIMO), that is, a base station (BS) schedules two user equipments to send, on same time-frequency resources, data of the two user equipments, so as to implement MIMO transmission; disadvantages of the method are that, it is required that channel orthogonality of the user equipments is good, and received signal-to-noise ratios of the two user equipments at the base station cannot differ significantly; otherwise, a user equipment with a poor channel condition may receive strong interference, and therefore, although virtual-MIMO brings a gain, its application scenarios are limited, and moreover the gain is small.

In conclusion, the user needs an MU-MIMO manner which is based on precoding, has a low receiving condition for a user equipment channel, and has high uplink spectral efficiency.

SUMMARY

In view of this, embodiments of the present invention provide an uplink MU-MIMO method, so as to implement uplink MU-MIMO, and improve uplink spectral efficiency.

According to a first aspect, an uplink MU-MIMO method includes:

receiving, by a base station, sounding reference signals sent by multiple user equipments, where the multiple user equipments meet a short-distance transmission condition; constructing a precoding matrix according to the received sounding reference signals; generating a first scheduling message according to the precoding matrix; sending the first scheduling message to the multiple user equipments, so as to schedule at least one user equipment in the multiple user equipments to generate at least one MAC packet data unit MAC PDU, and exchange the MAC PDUs between the multiple user equipments by using a short-distance transmission technology; and receiving, after a preset fixed time, uplink signals sent by the multiple user equipments, where the uplink signals are uplink signals generated after the multiple user equipments separately process the MAC PDUs.

In a first possible implementation manner of the first aspect, after the receiving, after a preset fixed time, uplink signals sent by the multiple user equipments, the method further includes:

decoding, by the base station, the uplink signals to obtain a codeword, and sending the codeword into a hybrid automatic repeat request process corresponding to the user equipment generating the MAC PDU.

With reference to the first possible implementation manner of the first aspect, in a second possible implementation manner, the base station checks the codeword, and if the codeword is incorrect, sends a retransmission scheduling message to the user equipment generating the MAC PDU or the multiple user equipments, so as to obtain an uplink retransmission signal uploaded by the user equipment.

With reference to the second possible implementation manner of the first aspect, in a third possible implementation manner, the base station receives the uplink retransmission signal sent by one or more user equipments.

According to a second aspect, an uplink MU-MIMO method includes:

sending, by a user equipment, a sounding reference signal to a base station, so that the base station constructs a precoding matrix according to the sounding reference signal, and generates a first scheduling message according to the precoding matrix; receiving the first scheduling message sent by the base station, where the first scheduling message includes a layer mapping rule and the precoding matrix; generating at least one MAC packet data unit MAC PDU according to the first scheduling message, and sending the MAC PDU, so that the multiple user equipments exchange the MAC PDUs; generating an uplink signal after the MAC PDU is processed in various layers; and sending, by using an antenna, the uplink signal to the base station.

In a first possible implementation manner of the second aspect, the generating, by the user equipment, at least one MAC packet data unit MAC PDU according to the first scheduling message, and sending the MAC PDU, so that the multiple user equipments exchange the MAC PDUs includes:

generating, by the user equipment, at least one MAC PDU, and sending the MAC PDU to other user equipments; and receiving MAC PDUs generated by the other user equipments.

In a second possible implementation manner of the second aspect, the receiving, by the user equipment, the first scheduling message sent by the base station, where the first scheduling message includes a layer mapping rule and the precoding matrix, includes:

performing, by the user equipment, channel coding, rate matching, and modulation on the MAC PDU, so as to generate a corresponding codeword; performing layer mapping of a corresponding layer on the codeword according to the layer mapping rule included in the first scheduling message; and using, according to the precoding matrix included in the first scheduling message, a corresponding vector to perform precoding on the layer, so as to obtain the uplink signal.

In a third possible implementation manner of the second aspect, the sending, by the user equipment by using an antenna, the uplink signal to the base station includes:

if the user equipment generates the MAC PDU, occupying, by the user equipment, a hybrid automatic repeat request process, to send, by using the antenna, the uplink signal to the base station; and if the user equipment receives all the MAC PDUs, occupying, by the user equipment, the hybrid automatic repeat request process, to send, by using the antenna, the uplink signal to the base station.

With reference to the second aspect or the first possible implementation manner of the second aspect or the second possible implementation manner of the second aspect or the third possible implementation manner of the second aspect, in a fourth possible implementation manner, the method further includes:

receiving, by the user equipment, a retransmission scheduling message sent by the base station; and sending an uplink retransmission signal to the base station according to the retransmission scheduling message.

With reference to the fourth possible implementation manner of the second aspect, in a fifth possible implementation manner, the sending, by the user equipment, an uplink retransmission signal to the base station according to the retransmission scheduling message includes:

retransmitting, by the user equipment, the uplink retransmission signal independently according to the retransmission scheduling message; and coordinating, according to the retransmission scheduling message, with the other user equipments to synchronously retransmit the uplink retransmission signal.

According to a third aspect, a base station is provided, where the base station includes:

a reference signal receiving unit, connected to a matrix constructing unit, and configured to receive sounding reference signals sent by multiple user equipments, where the multiple user equipments meet a short-distance transmission condition;

the matrix constructing unit, separately connected to the reference signal receiving unit and a message generating unit, and configured to construct a precoding matrix according to the received sounding reference signals;

a message generating unit, separately connected to the matrix constructing unit and a message sending unit, and configured to generate a first scheduling message according to the precoding matrix;

the message sending unit, separately connected to the message generating unit and an uplink signal receiving unit, and configured to send the first scheduling message to the multiple user equipments, so as to schedule at least one user equipment in the multiple user equipments to generate at least one MAC packet data unit MAC PDU, and exchange the MAC PDUs between the multiple user equipments by using a short-distance transmission technology; and the uplink signal receiving unit, connected to the message sending unit, and configured to receive, after a preset fixed time, uplink signals sent by the multiple user equipments, where the uplink signals are uplink signals generated after the multiple user equipments separately process the MAC PDUs.

In a first possible implementation manner of the third aspect, the access point device further includes:

a codeword obtaining unit, connected to the uplink signal receiving unit, and configured to decode the uplink signals to obtain a codeword, and send the codeword into a hybrid automatic repeat request process corresponding to the user equipment generating the MAC PDU.

With reference to the first possible implementation manner of the third aspect, in a second possible implementation manner, the base station further includes:

a codeword checking unit, separately connected to the codeword obtaining unit and a retransmission scheduling message sending unit, and configured to check the codeword; and the retransmission scheduling message sending unit, connected to the codeword checking unit, and configured to: if the codeword is incorrect, send a retransmission scheduling message to the user equipment generating the MAC PDU, or the multiple user equipments, so as to obtain an uplink retransmission signal.

With reference to the second possible implementation manner of the third aspect, in a third possible implementation manner, the base station further includes:

an uplink retransmission signal receiving unit, connected to the retransmission scheduling message sending unit, and configured to receive the uplink retransmission signal sent by one or more user equipments.

According to a fourth aspect, a base station is provided, where the base station includes:

a receiver, connected to a processor, and configured to receive sounding reference signals sent by multiple user equipments, where the multiple user equipments meet a short-distance transmission condition; and receive, after a preset fixed time, uplink signals sent by the multiple user equipments, where the uplink signals are uplink signals generated after the multiple user equipments separately process MAC PDUs;

the processor, separately connected to the receiver and a sender, and configured to construct a precoding matrix according to the received sounding reference signals; and generate a first scheduling message according to the precoding matrix; and the sender, connected to the processor, and configured to send the first scheduling message to the multiple user equipments, so as to schedule at least one user equipment in the multiple user equipments to generate at least one MAC packet data unit MAC PDU, and exchange the MAC PDUs between the multiple user equipments by using a short-distance transmission technology.

In a first possible implementation manner of the fourth aspect, the processor is further configured to decode the uplink signals to obtain a codeword, and send the codeword into a hybrid automatic repeat request process corresponding to the user equipment generating the MAC PDU.

With reference to the first possible implementation manner of the fourth aspect, in a second possible implementation manner, the processor is further configured to check the codeword; and the sender is further configured to: if the codeword is incorrect, send a retransmission scheduling message to the user equipment generating the MAC PDU, or the multiple user equipments, so as to obtain an uplink retransmission signal.

With reference to the second possible implementation manner of the fourth aspect, in a third possible implementation manner, the receiver is further configured to receive the uplink retransmission signal sent by one or more user equipments.

According to a fifth aspect, a user equipment is provided, where the user equipment includes:

a reference signal sending unit, connected to a scheduling message receiving unit, and configured to send a sounding reference signal to a base station, so that the base station constructs a precoding matrix according to the sounding reference signal, and generates a first scheduling message according to the precoding matrix;

the scheduling message receiving unit, separately connected to the reference signal sending unit and a MAC PDU generating unit, and configured to receive the first scheduling message sent by the base station, where the first scheduling message includes a layer mapping rule and the precoding matrix;

the MAC PDU generating unit, separately connected to the scheduling message receiving unit and an uplink signal generating unit, and configured to generate at least one MAC packet data unit MAC PDU according to the first scheduling message, and send the MAC PDU, so that the multiple user equipments exchange the MAC PDUs;

the uplink signal generating unit, separately connected to the MAC PDU generating unit and an uplink signal sending unit, and configured to generate the uplink signal after the MAC PDU is processed in various layers; and the uplink signal sending unit, connected to the uplink signal generating unit, and configured to send, by using an antenna, the uplink signal to the base station.

In a first possible implementation manner of the fifth aspect, the MAC PDU generating unit is specifically configured to generate at least one MAC PDU, and send the MAC PDU to other user equipments; and receive MAC PDUs generated by the other user equipments.

In a second possible implementation manner of the fifth aspect, the uplink signal generating unit is specifically configured to perform channel coding, rate matching, and modulation on the MAC PDU, so as to generate a corresponding codeword; perform layer mapping of a corresponding layer on the codeword according to the layer mapping rule included in the first scheduling message; and perform precoding on the layer according to a corresponding vector in the precoding matrix included in the first scheduling message, so as to obtain the uplink signal.

In a third possible implementation manner of the fifth aspect, the uplink signal sending unit is specifically configured to: if the MAC PDU is generated, occupy a hybrid automatic repeat request process, to send, by using the antenna, the uplink signal to the base station; and if all the MAC PDUs are received, occupy the hybrid automatic repeat request process, to send, by using the antenna, the uplink signal to the base station.

With reference to the fifth aspect or the first possible implementation manner of the fifth aspect or the second possible implementation manner of the fifth aspect or the third possible implementation manner of the fifth aspect, in a fourth possible implementation manner, the user equipment further includes:

a retransmission scheduling message receiving unit, separately connected to the uplink signal sending unit and an uplink signal retransmitting unit, and configured to receive a retransmission scheduling message sent by the base station; and the uplink signal retransmitting unit, connected to the retransmission scheduling message receiving unit, and configured to send an uplink retransmission signal to the base station according to the retransmission scheduling message.

With reference to the fourth possible implementation manner of the fifth aspect, in a fifth possible implementation manner, the uplink signal retransmitting unit is specifically configured to retransmit the uplink retransmission signal independently according to the retransmission scheduling message; and coordinate, according to the retransmission scheduling message, with the other user equipments to synchronously retransmit the uplink retransmission signal.

According to a sixth aspect, a user equipment is provided, where the user equipment includes:

a sender, connected to a processor, and configured to send a sounding reference signal to a base station, so that the base station constructs a precoding matrix according to the sounding reference signal, and generates a first scheduling message according to the precoding matrix; and send, by using an antenna, an uplink signal to the base station;

a receiver, connected to the processor, and configured to receive the first scheduling message sent by the base station, where the first scheduling message includes a layer mapping rule and the precoding matrix; and the processor, separately connected to the sender and the receiver, and configured to generate at least one MAC packet data unit MAC PDU according to the first scheduling message, and send the MAC PDU, so that the multiple user equipments exchange the MAC PDUs; and generate the uplink signal after the MAC PDU is processed in various layers.

In a first possible implementation manner of the sixth aspect, the processor is further specifically configured to generate at least one MAC PDU;

the sender is further specifically configured to send the MAC PDU to other user equipments; and the receiver is further specifically configured to receive MAC PDUs generated by the other user equipments.

In a second possible implementation manner of the sixth aspect, the processor is further specifically configured to perform channel coding, rate matching, and modulation on the MAC PDU, so as to generate a corresponding codeword; perform layer mapping of a corresponding layer on the codeword according to the layer mapping rule included in the first scheduling message; and perform precoding on the layer according to a corresponding vector in the precoding matrix included in the first scheduling message, so as to obtain the uplink signal.

In a third possible implementation manner of the sixth aspect, the sender is further specifically configured to: if the MAC PDU is generated, occupy a hybrid automatic repeat request process, to send, by using the antenna, the uplink signal to the base station; and if all the MAC PDUs are received, occupy the hybrid automatic repeat request process, to send, by using the antenna, the uplink signal to the base station.

With reference to the sixth aspect or the first possible implementation manner of the sixth aspect or the second possible implementation manner of the sixth aspect or the third possible implementation manner of the sixth aspect, in a fourth possible implementation manner, the receiver is further configured to receive a retransmission scheduling message sent by the base station; and the sender is further configured to send an uplink retransmission signal to the base station according to the retransmission scheduling message.

With reference to the fourth possible implementation manner of the sixth aspect, in a fifth possible implementation manner, the sender is further specifically configured to retransmit the uplink retransmission signal independently according to the retransmission scheduling message; and coordinate, according to the retransmission scheduling message, with the other user equipments to synchronously retransmit the uplink retransmission signal.

According to a seventh aspect, an uplink MU-MIMO system is provided, where the system includes:

the base station and/or the multiple user equipments, where the multiple user equipments meet a short-distance transmission condition.

It can be seen from the foregoing solutions that, in the embodiments of the present invention, a base station monitors sounding reference signals sent by multiple user equipments; the base station schedules the multiple user equipments; the user equipments generate and exchange MAC PDUs, and the multiple user equipments process the MAC PDUs according to a same scheduling message and send, by using an antenna, the MAC PDUs, as if multiple antennas of one virtual user equipment simultaneously perform transmission. Compared with the prior art, the embodiments of the present invention greatly improve uplink spectral efficiency of a system.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the present invention in detail with reference to the accompanying drawings and embodiments. It should be understood that the specific embodiments described herein are merely used for describing the present invention, but are not intended to limit the present invention.

To describe the technical solutions of the present invention, the following makes description with specific embodiments.

Figure 1:
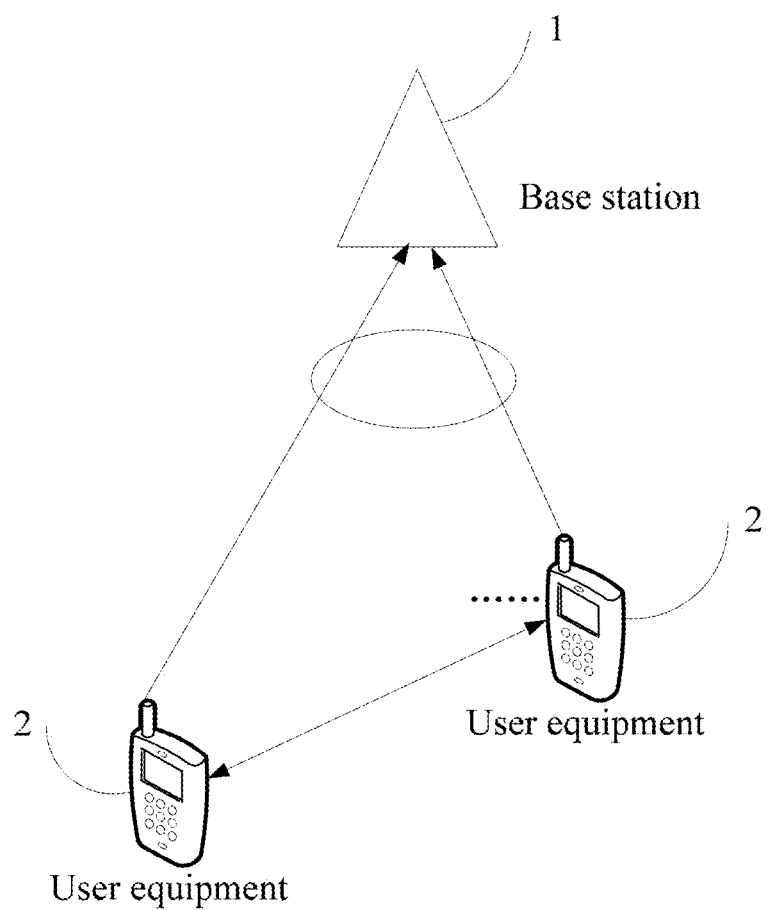
FIG. 1 is a schematic diagram of a scenario of an uplink MU-MIMO system according to an embodiment of the present invention.

FIG. 1 shows a schematic diagram of a scenario to which an uplink MU-MIMO system according to an embodiment of the present invention is applicable. For ease of description, only a part relevant to this embodiment is shown.

As shown in FIG. 1, the system includes a base station 1 and multiple user equipments 2. The base station 1 is connected to and communicates with the multiple user equipments 2 in a wireless manner. The multiple user equipments 2 are on a same channel, meet a short-distance transmission condition, and are terminal devices having a wireless communication function.

To implement uplink MU-MIMO and improve uplink spectral efficiency of the system, in the embodiment of the present invention, the multiple user equipments generally refer to any number of user equipments which are not less than two. The multiple user equipments meet the short-distance transmission condition. As shown in FIG. 1, the base station 1 monitors sounding reference signals sent by the multiple user equipments 2. The base station 1 combines the multiple user equipments 2 to serve as a virtual user equipment, and antenna transmission of the multiple user equipments 2 are considered as transmission of multiple antennas of one virtual user equipment. The base station 1 obtains uplink channel matrixes of the multiple antennas of the virtual user equipment according to the sounding reference signals sent by the virtual user equipment. The base station 1 constructs, according to the uplink channel matrix, a precoding matrix for uplink transmission of the virtual user equipment. Based on the precoding matrix, the base station 1 generates and sends a first scheduling message to the virtual user equipment, so as to schedule the virtual user equipment. After receiving the scheduling message, the virtual user equipment generates a MAC packet data unit MAC PDU. The virtual user equipment performs channel coding, rate matching, and modulation on the MAC PDU, so as to obtain a codeword, and maps the codeword to at least two layers according to a layer mapping rule. Then, the virtual user equipment uses, according to the first scheduling message, the precoding matrix to perform precoding on the codeword of the multiple layers, so as to generate an uplink signal. The virtual user equipment sends, by using the multiple antennas, the uplink signal. The base station 1 receives, after a preset fixed time, the uplink signal that undergoes joint precoding and is sent by the virtual user equipment.

In this embodiment, the multiple user equipments 2 forming the virtual user equipment meet the short-distance transmission condition, and a short-distance transmission technology includes but is not limited to: WIFI, Bluetooth and LTE D2D. After the multiple user equipments 2 send the sounding reference signals to the base station 1, at least one user equipment in the multiple user equipments 2 generates at least one MAC PDU according to the received first scheduling message sent by the base station 1, and then the multiple user equipments 2 exchange the MAC PDUs. With exchanging of the MAC PDUs, all the multiple user equipments 2 participating in MU-MIMO sending obtain a same MAC PDU. The multiple user equipments 2 separately perform channel coding, rate matching, and modulation on the MAC PDUs, so as to obtain codewords, and map the codewords to multiple layers according to the layer mapping rule. The multiple user equipments 2 perform precoding on the layer according to a vector, corresponding to each user equipment 2, indicated by the first scheduling message in the precoding matrix, so as to obtain the uplink signal. Different antennas of different UEs may use different precoding vectors in the precoding matrix. The uplink signal is sent by using the antennas of the multiple user equipments 2, and uplink MU-MIMO with joint precoding by the multiple user equipments is implemented.

In this embodiment, the multiple user equipments implement the uplink MU-MIMO. The user equipments separately send same data. Once an environment of a certain user equipment worsens, a throughput rate and/or reliability of data transmission of the user equipment may decrease sharply, which does not affect data uploading of other user equipments. Meanwhile, the multiple user equipments exchange data by using the short-distance transmission technology, which poses no requirements on channel orthogonality between the user equipments, and a user equipment with a poor channel condition will not receive interference, leading to wide application scenarios and a great gain.

Figure 2:
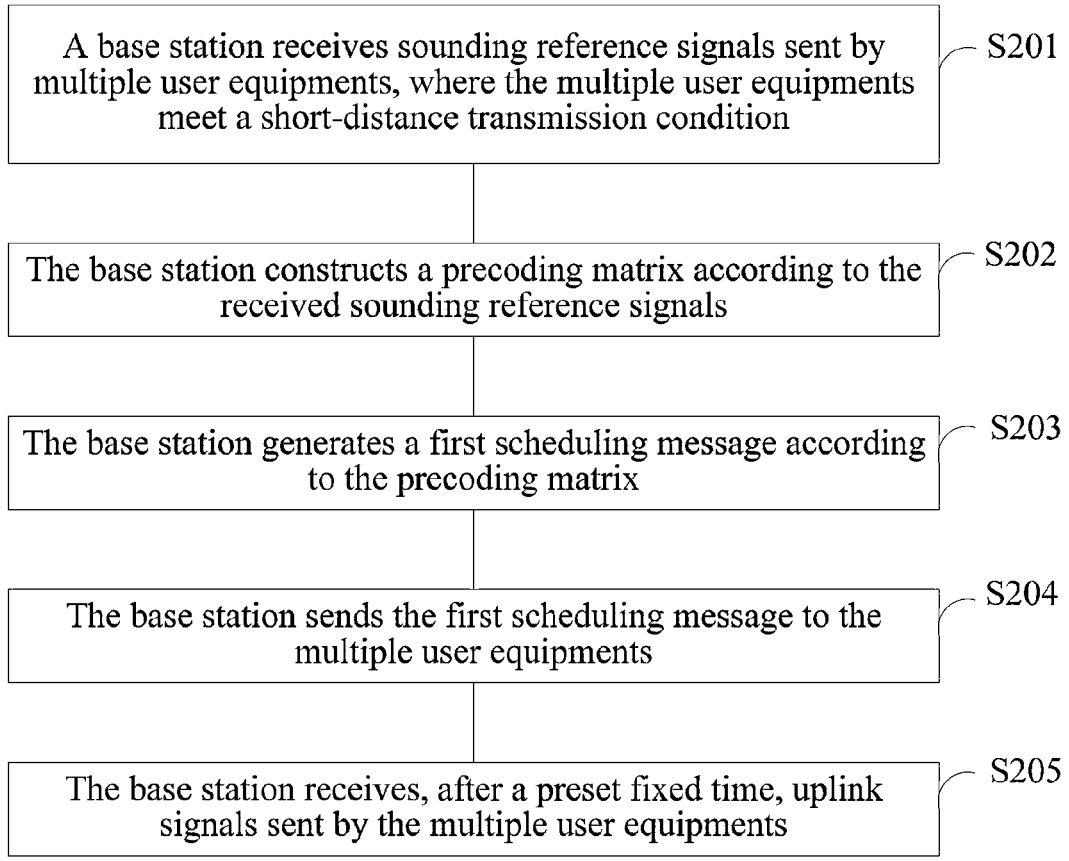
FIG. 2 is an implementation flowchart of an uplink MU-MIMO method according to another embodiment of the present invention.

FIG. 2 shows an implementation flowchart of an uplink MU-MIMO method according to another embodiment of the present invention. This embodiment is executed by the base station 1 in FIG. 1, and the process of the method is described in detail as follows:

In step S201, a base station receives sounding reference signals sent by multiple user equipments, where the multiple user equipments meet a short-distance transmission condition.

It should be noted that, it can be seen from the description of the foregoing embodiment that there are two or more user equipments. Essentially, the uplink MU-MIMO method is not changed. Similarly, because a user equipment has one or more antennas, the uplink MU-MIMO method is not changed essentially either. Therefore, in this embodiment and in subsequent embodiments, a configuration process of synthetic communications is described by using an example where two user equipments each have a sounding reference signal process of one antenna. The "first" of the first scheduling message is for ease of expressing and referring, and the first scheduling message refers to a scheduling message sent by the base station. The first scheduling message expressed in the present invention does not mean that there must be a second scheduling message, which is corresponding to the first scheduling message, in a specific implementation manner of the present invention.

In this embodiment, the base station receives the sounding reference signals sent by two user equipments, and the base station obtains uplink channel matrixes of the two user equipments according to the sounding reference signals, and determines whether the two user equipments meet the short-distance transmission condition. If the two user equipments do not meet the short-distance transmission condition, scheduling is performed according to an existing MIMO method. If the two user equipments meet the short-distance transmission condition, the two uplink channel matrixes are combined to construct a precoding matrix.

In step S202, the base station constructs the precoding matrix according to the received sounding reference signals.

In this embodiment, the base station obtains the uplink channel matrixes of the two user equipments according to the received sounding reference signals, and combines the uplink channel matrixes of the two user equipments to construct the precoding matrix.

In step S203, the base station generates the first scheduling message according to the precoding matrix.

In this embodiment, the base station generates the first scheduling message according to the precoding matrix, the scheduling message of the base station, and a layer mapping rule.

In step S204, the base station sends the first scheduling message to the multiple user equipments, so as to schedule at least one user equipment in the multiple user equipments to generate at least one MAC packet data unit MAC PDU, and exchange the MAC PDUs between the multiple user equipments by using a short-distance transmission technology.

In this embodiment, the base station sends the first scheduling message to the two user equipments, so that at least one user equipment in the two user equipments generates the MAC PDU. The two user equipments exchange the MAC PDUs by using the short-distance transmission technology, and by exchanging, the two user equipments obtain a same MAC PDU. The exchanging of the MAC PDUs is specifically that: the user equipment generates at least one MAC PDU, and sends the MAC PDU to other user equipments; and the user equipment receives MAC PDUs generated by the other user equipments. Then, the two user equipments separately perform channel coding, rate matching, and modulation on the MAC PDUs, so as to obtain a codeword. The user equipment maps the codeword to two layers according to the layer mapping rule. The user equipment performs precoding on the layers according to a corresponding precoding vector in the precoding matrix and the two layers, so as to obtain an uplink signal.

The method that the base station makes the two user equipments simultaneously receive the first scheduling message includes: sending the first scheduling message twice, that is, sending one first scheduling message to each user equipment; during configuration of synthetic communications, notifying the user equipment of a cell radio network temporary identifier (Cell Radio Network Temporary Identifier C-RNTI); and using a public radio network temporary identifier RNTI which may be identified by the user equipment. These methods are existing methods, and are not described herein again.

In step S205, the base station receives, after a preset fixed time, uplink signals sent by the multiple user equipments, where the uplink signals are uplink signals generated after the multiple user equipments separately process the MAC PDUs.

In this embodiment, the MAC PDU needs to be exchanged between the two user equipments first, and therefore, a conventional time sequence needs to be changed. Therefore, the base station needs to properly delay scheduling, to avoid temporal collision between data that is scheduled in a delayed manner and data that is normally scheduled. Therefore, the base station receives, after the preset fixed time, the uplink signals sent by the two user equipments, where the preset fixed time is a fixed value, which is greater than or equal to a preset time in the prior art.

Further, the base station decodes the uplink signals to obtain the codeword, and sends the codeword into a hybrid automatic repeat request process corresponding to the user equipment generating the MAC PDU.

In this embodiment, the number of the hybrid automatic repeat request processes is the same as the number of the codewords.

Further, the base station decodes the uplink signals to obtain the codeword, and after sending the codeword into the hybrid automatic repeat request process corresponding to the user equipment generating the MAC PDU, the base station checks the codeword. If the codeword is incorrect, the base station sends a retransmission scheduling message to the user equipment generating the MAC PDU or the multiple user equipments, so as to obtain an uplink retransmission signal uploaded by the user equipment.

Specifically, the base station checks the codeword. If one or two codewords are incorrect, the base station sends the retransmission scheduling message to the user equipment generating the MAC PDU, or the multiple user equipments; if two codewords are incorrect, the base station sends the retransmission scheduling message the multiple user equipments, and other equipment coordinates with the user equipment, generating the MAC PDU, to send the uplink retransmission signal.

Further, the base station receives the uplink retransmission signal sent by one or more user equipments.

Specifically, in one case, the base station receives the uplink signal independently retransmitted by the user equipment generating the MAC PDU.

In another case, the base station receives the uplink signal retransmitted by the user equipment generating the MAC PDU and coordinating with other user equipments.

In this embodiment, by simultaneously scheduling multiple user equipments, the multiple user equipments exchange data and perform joint precoding to obtain uplink signals, and the multiple user equipments simultaneously send, by using their respective antennas, the uplink signals to a base station, which implements the uplink MU-MIMO method, and improves uplink spectral efficiency.

Figure 3:
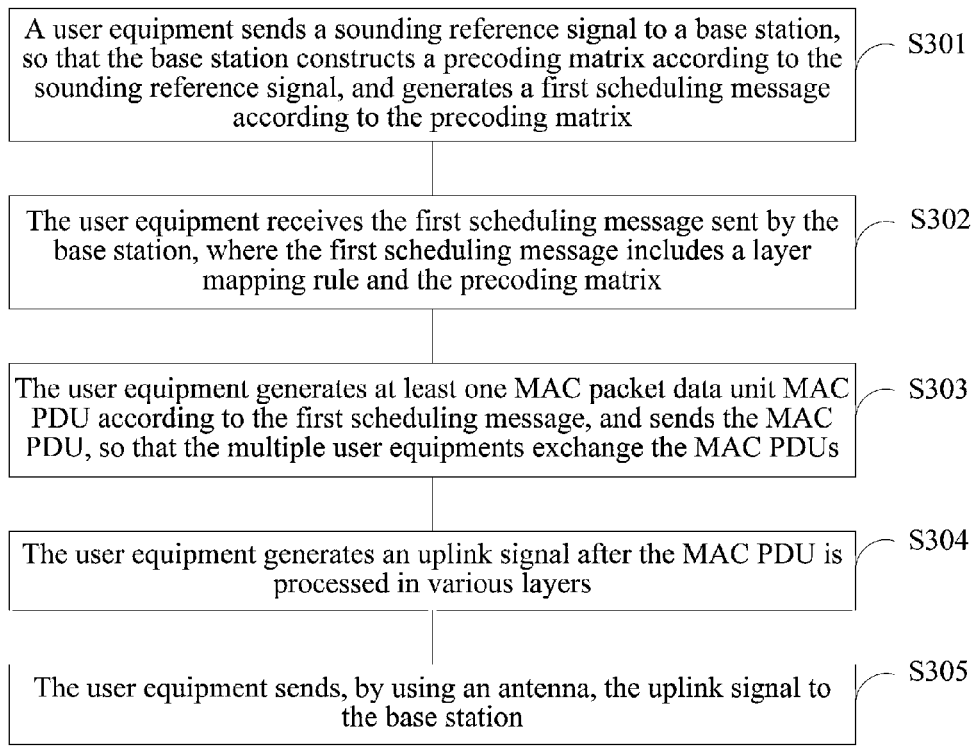
FIG. 3 is an implementation flowchart of an uplink MU-MIMO method according to another embodiment of the present invention.

FIG. 3 shows an implementation process of an uplink MU-MIMO method according to another embodiment of the present invention. This embodiment is executed by the user equipment 2 in FIG. 1, and a process of the method is described in detail as follows:

In step S301, a user equipment sends a sounding reference signal to a base station, so that the base station constructs a precoding matrix according to the sounding reference signal, and generates a first scheduling message according to the precoding matrix.

In step S302, the user equipment receives the first scheduling message sent by the base station, where the first scheduling message includes a layer mapping rule and the precoding matrix.

In this embodiment, two user equipments simultaneously receive the first scheduling message, where the first scheduling message includes the layer mapping rule and the precoding matrix, and parse the first scheduling message to obtain the precoding matrix, the scheduling message, and the layer mapping rule. The precoding matrix is constructed by using uplink channel matrixes of the two user equipments. The two user equipments obtain, according to the precoding matrix, precoding vectors of the two user equipments to perform precoding. By performing the step, the user equipments have the same scheduling message and layer mapping rule.

In step S303, the user equipment generates at least one MAC packet data unit MAC PDU according to the first scheduling message, and sends the MAC PDU, so that the multiple user equipments exchange the MAC PDUs.

In this embodiment, specific steps of the user equipment generating at least one MAC packet data unit MAC PDU according to the first scheduling message, and sending the MAC PDU, so that the multiple user equipments exchange the MAC PDUs are:

Step 11: Two user equipments generate at least one MAC PDU according to a scheduling message indication in the first scheduling message, where includes several cases as follows:

1. one user equipment generates at least one MAC PDU, which specifically includes two cases:
   one user equipment generates one MAC PDU; and
   one user equipment generates two MAC PDUs.
2. each of the two user equipments generates one MAC PDU.

Step 12: The two user equipments exchange the MAC PDUs.

The exchanging of the MAC PDUs is specifically that: if one user equipment generates one or two MAC PDUs, the user equipment sends the MAC PDU to the other user equipment by using a short-distance transmission technology; and if each of the two user equipments generates one MAC PDU, the two user equipments exchange the MAC PDUs by using the short-distance transmission technology. It can also be described in this way: the user equipment generates at least one MAC PDU, and sends the MAC PDU to other user equipments; and the user equipment receives MAC PDUs generated by the other user equipments.

By performing the foregoing steps, the two user equipments obtain at least one MAC PDU.

In step S304, the user equipment generates an uplink signal after the MAC PDU is processed in various layers.

In this embodiment, specific steps that, after obtaining the MAC PDU, the user equipment generating the uplink signal after the MAC PDU is processed in various layers include:

Step 21: The user equipment performs channel coding, rate matching, and modulation on the MAC PDU, so as to generate a corresponding codeword.

Step 22: The user equipment performs layer mapping of a corresponding layer on the codeword according to the layer mapping rule included in the first scheduling message.

Step 23: The user equipment performs precoding on the layer according to a corresponding vector in the precoding matrix included in the first scheduling message, so as to obtain the uplink signal.

In step S305, the user equipment sends, by using an antenna, the uplink signal to the base station.

Figure 4:
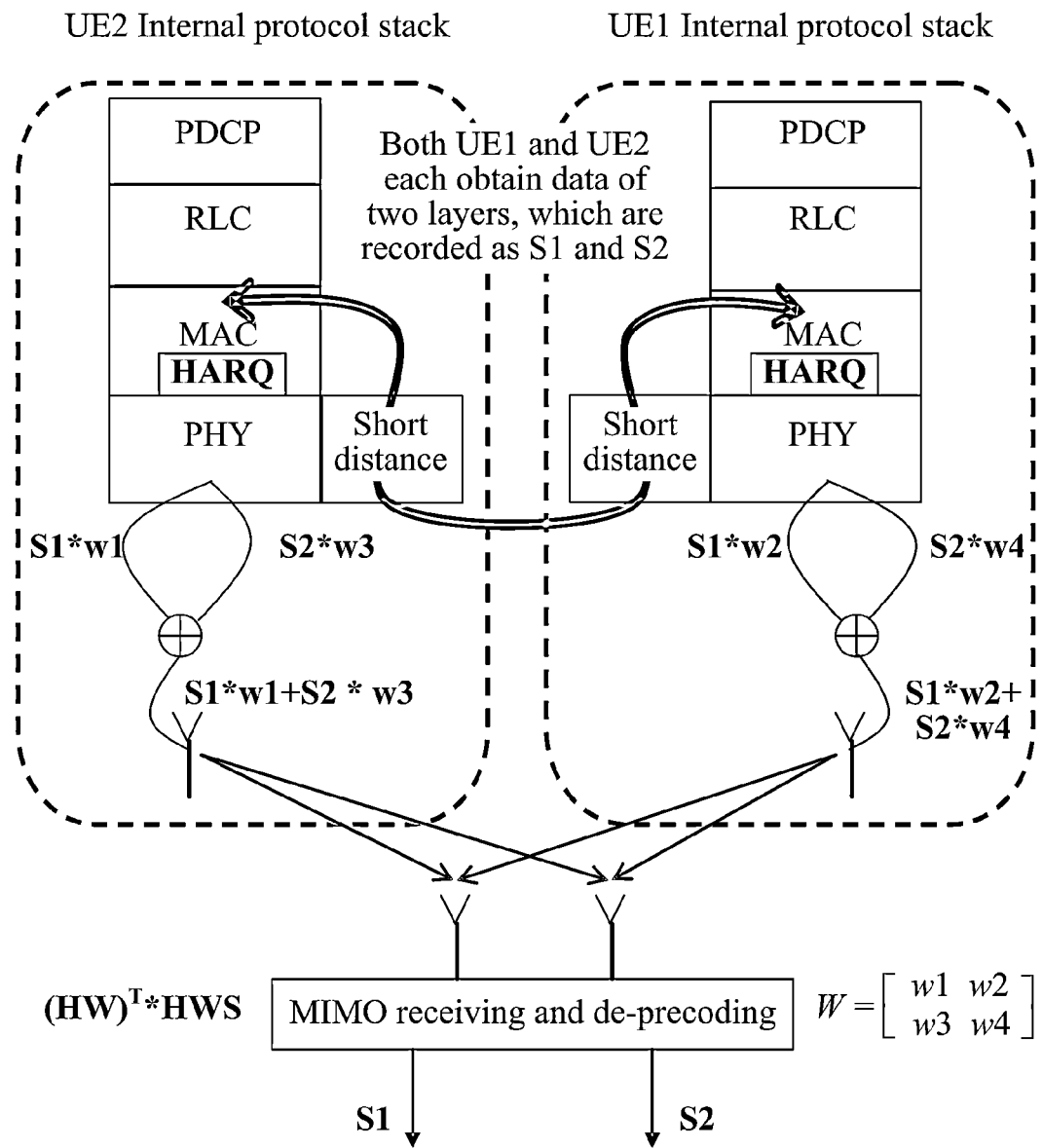
FIG. 4 is a schematic diagram of implementing uplink MU-MIMO by user equipments according to another embodiment of the present invention.

In this embodiment, after obtaining the uplink signal, the two user equipments simultaneously send, by using an antenna of each of the two user equipments, the uplink signal to the base station. For a processing process of two user equipments implementing uplink MU-MIMO, refer to FIG. 4.

Figure 5:
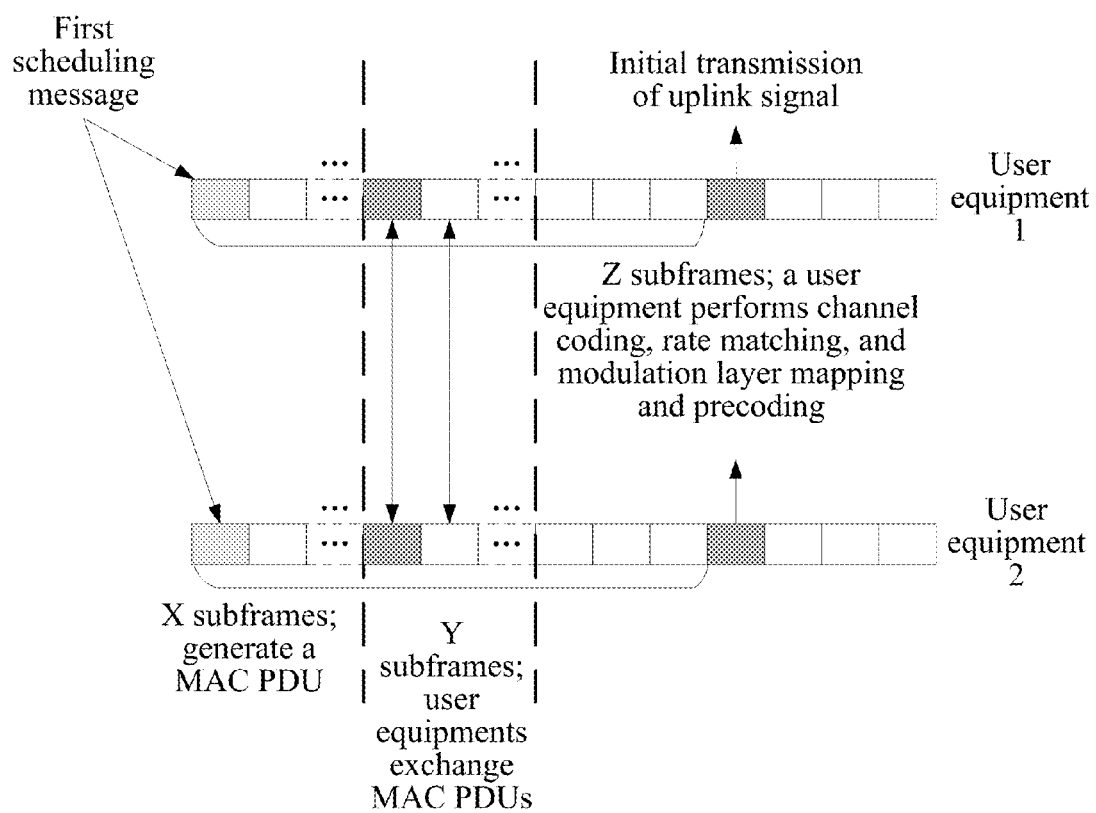
FIG. 5 is a sequence chart of processing a first scheduling message by user equipments according to another embodiment of the present invention.

It should be noted that a corresponding processing time sequence, starting from when the two user equipments receive the first scheduling message, is shown in FIG. 5.

Because the MAC PDU needs to be exchanged between the two user equipments, sending time is changed from originally X+Z to X+Y+Z, with added processing time of Z subframes. Sending time in the prior art is X+Z, which is four subframes. Therefore, sending time X+Y+Z of the present invention is greater than four subframes. However, the X+Y+Z must be a fixed value. Therefore, compared with that in the prior art, the base station needs to delay scheduling, and avoid temporal collision between data that is scheduled in a delayed manner and data that is normally scheduled.

Specifically, cases, in which the user equipment sends, by using the antenna, the uplink signal, are as follows:

In one case, if the user equipment generates the MAC PDU, the user equipment occupies a hybrid automatic repeat request process, to send, by using the antenna, the uplink signal to the base station.

In this embodiment, the user equipment generating the MAC PDU occupies the hybrid automatic repeat request processes whose quantity is the same as the quantity of the MAC PDUs, to perform sending.

In another case, if the user equipment receives all the MAC PDUs, the user equipment occupies the hybrid automatic repeat request process, to send, by using the antenna, the uplink signal to the base station.

In this embodiment, the user equipment only receiving the MAC PDU does not occupy the hybrid automatic repeat request process to perform sending, or perform retransmission. After the sending, the user equipment deletes data in a cache. In a case where there are two MAC PDUs, the user equipment only receiving the MAC PDU may also occupy one hybrid automatic repeat request process, to send, by using the antenna, the uplink signal to the base station.

After checking the uplink signal, if the base station finds an error, the base station sends a retransmission scheduling message to one or more user equipments.

Preferably, the user equipment receives the retransmission scheduling message sent by the base station; and the user equipment sends an uplink retransmission signal to the base station according to the retransmission scheduling message.

In this embodiment, according to a checking result, the retransmission scheduling message may be sent to the user equipment generating the MAC PDU, and may also be sent to the two user equipments participating in the precoding. The user equipment sends the uplink retransmission signal to the base station according to the retransmission scheduling message. Specifically, the user equipment retransmits the uplink signal independently according to the retransmission scheduling message; and the user equipment coordinates, according to the retransmission scheduling message, with the other user equipments to synchronously retransmit the uplink signal.

In this embodiment, if one user equipment in the two user equipments generates two MAC PDUs, the other user equipment may also occupy one process to send the uplink signal. If the retransmission scheduling message feeds back that two codewords are both incorrect, the other user equipment coordinates with the user equipment generating the two MAC PDUs to perform synchronous retransmission. If the rescheduling message feeds back that only one codeword is incorrect, the user equipment generating the two MAC PDUs performs retransmission independently, and the other user equipment deletes a cache.

In this embodiment, the base station schedules multiple user equipments, and the user equipments exchange data; because information exchange is performed by using the short-distance transmission technology, which does not add workload to the base station; the user equipments performs joint precoding, and obtains the uplink signal; the multiple user equipments simultaneously send, by using the antenna of each of the multiple user equipments, the uplink signal to the base station, and an environment of the user equipment and a channel condition of the user equipments exert limited effects on the uplink MU-MIMO, which also improves uplink spectral efficiency, and results in very wide application scenarios.

Figure 6:
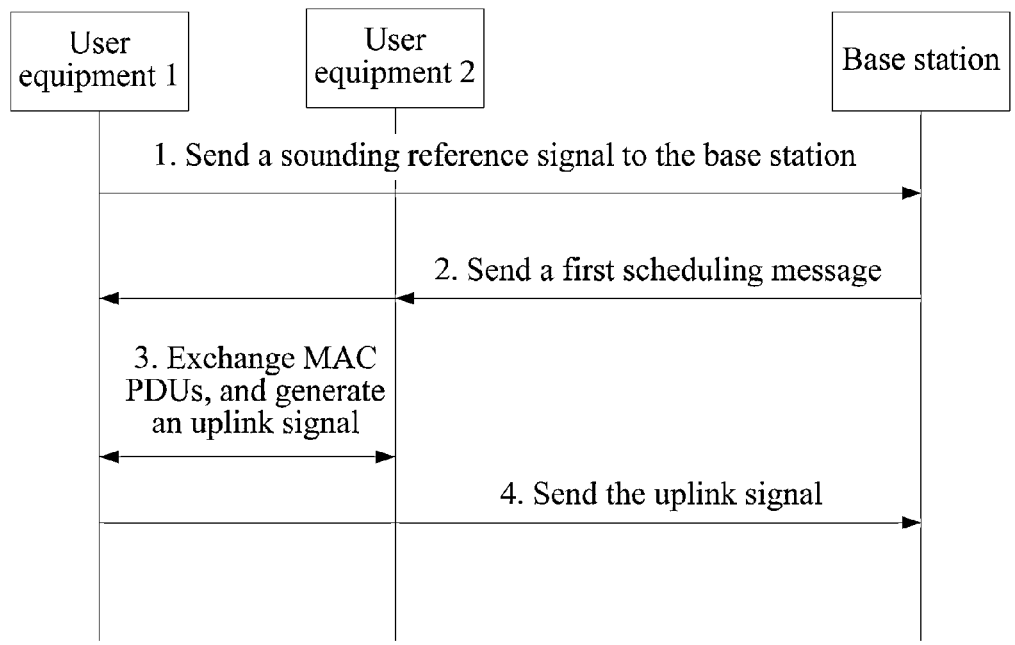
FIG. 6 is an interaction flowchart of an uplink MU-MIMO method according to another embodiment of the present invention.

FIG. 6 shows an interaction process of an uplink MU-MIMO method according to another embodiment of the present invention. The process of the method is described in detail as follows:

1: Two user equipments send sounding reference signals to a base station.

In this embodiment, the base station receives the sounding reference signals sent by the two user equipments, where the user equipments meet a short-distance transmission condition.

2: The base station sends a first scheduling message to the two user equipments.

In this embodiment, the base station receives the sounding reference signals sent by the two user equipments; constructs a precoding matrix according to the sounding reference signals; generates the first scheduling message according to the precoding matrix; sends the first scheduling message to the two user equipments, so as to schedule at least one user equipment in the at least two user equipments to generate a MAC packet data unit MAC PDU, and exchange the MAC PDUs between the two user equipments; and receives, after a preset fixed time, uplink signals sent by the two user equipments, where the uplink signals are uplink signals generated after the two user equipments separately process the MAC PDUs.

3: The two user equipments exchange the MAC PDUs, perform joint precoding, and generate an uplink signal.

In this embodiment, the two user equipments receive the first scheduling message sent by the base station; obtain at least one MAC packet data unit MAC PDU according to the first scheduling message, generate the uplink signal after the MAC PDU is processed in various layers; and send, by using an antenna, the uplink signal to the base station.

The two user equipments generate at least one MAC packet data unit MAC PDU according to the first scheduling message, and send the MAC PDU, so that multiple user equipments exchange the MAC PDUs, which is specifically: the user equipment generates at least one MAC PDU, and sends the MAC PDU to other user equipments; and the user equipment receives MAC PDUs generated by the other user equipments.

The user equipment generating the uplink signal after the MAC PDU is processed in various layers is specifically:

separately performing, by the two user equipments, channel coding, rate matching, and modulation on the MAC PDUs, so as to generate corresponding codewords; performing layer mapping of a corresponding layer on the codewords according to a layer mapping rule included in the first scheduling message; and performing precoding on the layer according to a corresponding vector in the precoding matrix included in the first scheduling message, so as to obtain the uplink signal.

The user equipment sending, by using the antenna, the uplink signal to the base station is specifically:

if the user equipment generates the MAC PDU, occupying, by the user equipment, a hybrid automatic repeat request process, to send, by using the antenna, the uplink signal to the base station; and if the user equipment receives all the MAC PDUs, occupying, by the user equipment, the hybrid automatic repeat request process, to send, by using the antenna, the uplink signal to the base station; and 4: The base station receives, after the preset fixed time, the uplink signals sent by the multiple user equipments.

In this embodiment, the base station receives, after the preset fixed time, the uplink signals sent by the two user equipments, where the uplink signals are uplink signals generated after the two user equipment separately process the MAC PDUs in various layers. Then, the base station decodes the uplink signals, and sends the codeword, obtained by decoding, into the hybrid automatic repeat request process corresponding to the user equipment generating the MAC PDU, where the number of the hybrid automatic repeat request processes is the same as the number of codewords.

Further, the base station checks the codeword, and if the codeword is incorrect, sends a retransmission scheduling message to the user equipment generating the MAC PDU, or the multiple user equipments, so as to obtain an uplink retransmission signal.

In this embodiment, the base station checks the codeword, and if one or two codewords are incorrect, sends the retransmission scheduling message to the user equipment generating the MAC PDU, or the two user equipments; the base station checks the codeword, and if the two codewords are incorrect, sends the retransmission scheduling message to the two user equipments.

Further, the user equipment receives the retransmission scheduling message sent by the base station.

Further, the user equipment sends the uplink retransmission signal to the base station according to the retransmission scheduling message.

Specifically, the user equipment retransmits the uplink signal independently according to the retransmission scheduling message; and the user equipment coordinates, according to the retransmission scheduling message, with the other user equipments to synchronously retransmit the uplink signal.

Further, the base station receives the uplink retransmission signal sent by one or more user equipments.

Figure 7:
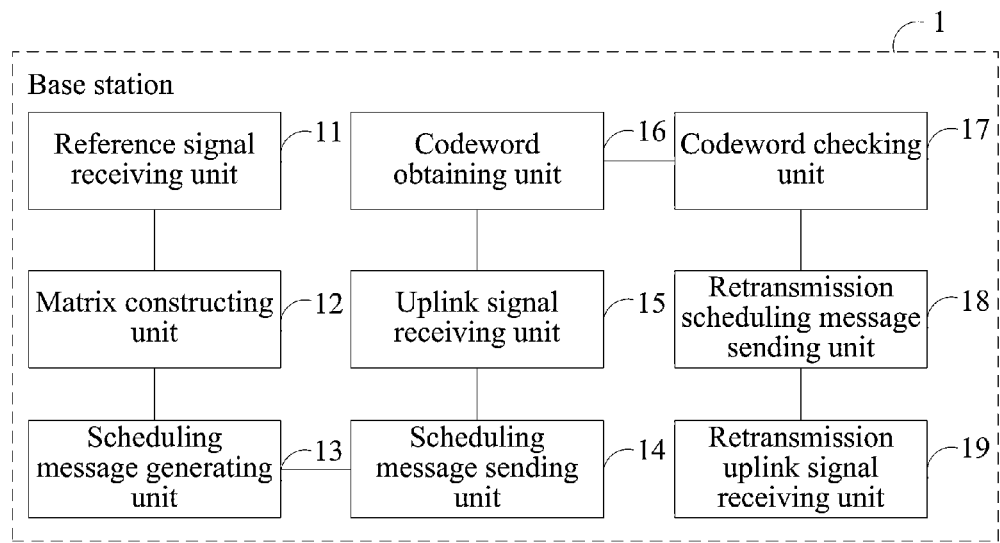
FIG. 7 is a structural composition block diagram of a base station according to another embodiment of the present invention.

FIG. 7 shows a composition structure of a base station according to another embodiment of the present invention. For ease of description, only a part relevant to the embodiment of the present invention is shown.

A base station 1 includes:

a reference signal receiving unit 11, connected to a matrix constructing unit 12, and configured to receive sounding reference signals sent by multiple user equipments, where the multiple user equipments meet a short-distance transmission condition;

the matrix constructing unit 12, separately connected to the reference signal receiving unit 11 and a message generating unit 13, and configured to construct a precoding matrix according to the received sounding reference signals;

the message generating unit 13, separately connected to the matrix constructing unit 12 and a message sending unit 14, and configured to generate a first scheduling message according to the precoding matrix;

the message sending unit 14, separately connected to the message generating unit 13 and an uplink signal receiving unit 15, and configured to send the first scheduling message to the multiple user equipments, so as to schedule at least one user equipment in the multiple user equipments to generate at least one MAC packet data unit MAC PDU, and exchange the MAC PDUs between the multiple user equipments by using a short-distance transmission technology; and the uplink signal receiving unit 15, connected to the message sending unit 14, and configured to receive, after a preset fixed time, uplink signals sent by the multiple user equipments, where the uplink signals are uplink signals generated after the multiple user equipments separately process the MAC PDUs.

Further, the base station 1 further includes:

a codeword obtaining unit 16, connected to the uplink signal receiving unit 15, and configured to decode the uplink signals to obtain a codeword, and send the codeword into a hybrid automatic repeat request process corresponding to the user equipment generating the MAC PDU.

Further, the base station 1 further includes:

a codeword checking unit 17, separately connected to the codeword obtaining unit 16 and a retransmission scheduling message sending unit 18, and configured to check the codeword; and the retransmission scheduling message sending unit 18, connected to the codeword checking unit 17, and configured to send a retransmission scheduling message to the user equipment generating the MAC PDU, or the multiple user equipments, so as to obtain an uplink retransmission signal.

Further, the base station 1 further includes:

an uplink retransmission signal receiving unit 19, connected to the retransmission scheduling message sending unit 18, and configured to receive the uplink retransmission signal sent by one or more user equipments.

The base station provided in this embodiment may use the foregoing corresponding uplink MU-MIMO methods. For details, refer to relevant descriptions of the embodiments, corresponding to FIG. 1 and FIG. 2, of the uplink MU-MIMO methods, which are not described herein again.

It should be understood by persons of ordinary skill in the art that units included in the base station embodiment are only divided according to functional logic, but the present invention is not limited to the foregoing division as long as relevant functions can be implemented; in addition, specific names of functional units are just for distinguishing the functional units from each other, and the protection scope of the application is not limited thereto.

Figure 8:
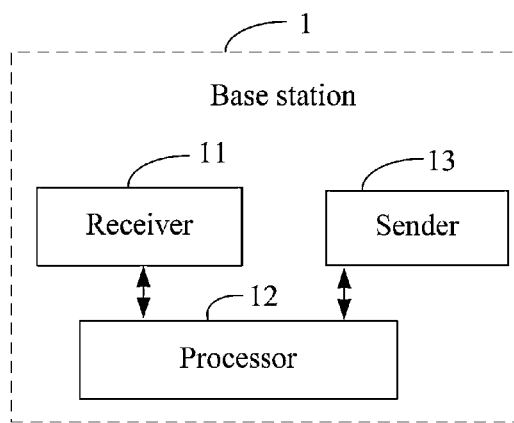
FIG. 8 is a structural composition block diagram of a base station according to another embodiment of the present invention.

FIG. 8 shows a composition structure of a base station according to another embodiment of the present invention. The base station provided in the embodiment of the present invention may be configured to implement the method of the embodiment corresponding to FIG. 2. For ease of description, only a part relevant to the embodiment of the present invention is shown. For specific technical details which are not disclosed, refer to the embodiment corresponding to FIG. 2.

A base station 1 includes:

a receiver 11, connected to a processor 12, and configured to receive sounding reference signals sent by multiple user equipments, where the multiple user equipments meet a short-distance transmission condition; receive, after a preset fixed time, uplink signals sent by the multiple user equipments, where the uplink signals are uplink signals generated after the multiple user equipments separately process MAC PDUs;

the processor 12, separately connected to the receiver 11 and a sender 13, and configured to construct a precoding matrix according to the received sounding reference signals; and generate a first scheduling message according to the precoding matrix; and the sender 13, connected to the processor 12, and configured to send the first scheduling message to the multiple user equipments, so as to schedule at least one user equipment in the multiple user equipments to generate at least one MAC packet data unit MAC PDU, and exchange the MAC PDUs between the multiple user equipments by using a short-distance transmission technology.

Further, the processor 12 is further configured to decode the uplink signals to obtain a codeword, and send the codeword into a hybrid automatic repeat request process corresponding to the user equipment generating the MAC PDU.

Further, the processor 12 is further configured to check the codeword.

The sender 13 is further configured to: if the codeword is incorrect, send a retransmission scheduling message to the user equipment generating the MAC PDU, or the multiple user equipments, so as to obtain an uplink retransmission signal.

Further, the receiver 11 is further configured to receive the uplink retransmission signal sent by one or more user equipments.

It should be understood by persons skilled in the art that the composition structure shown in FIG. 8 does not constitute a limitation to the base station, and may include components more or less than the components shown in the drawing, or some component combinations, or different component layouts.

Figure 9:
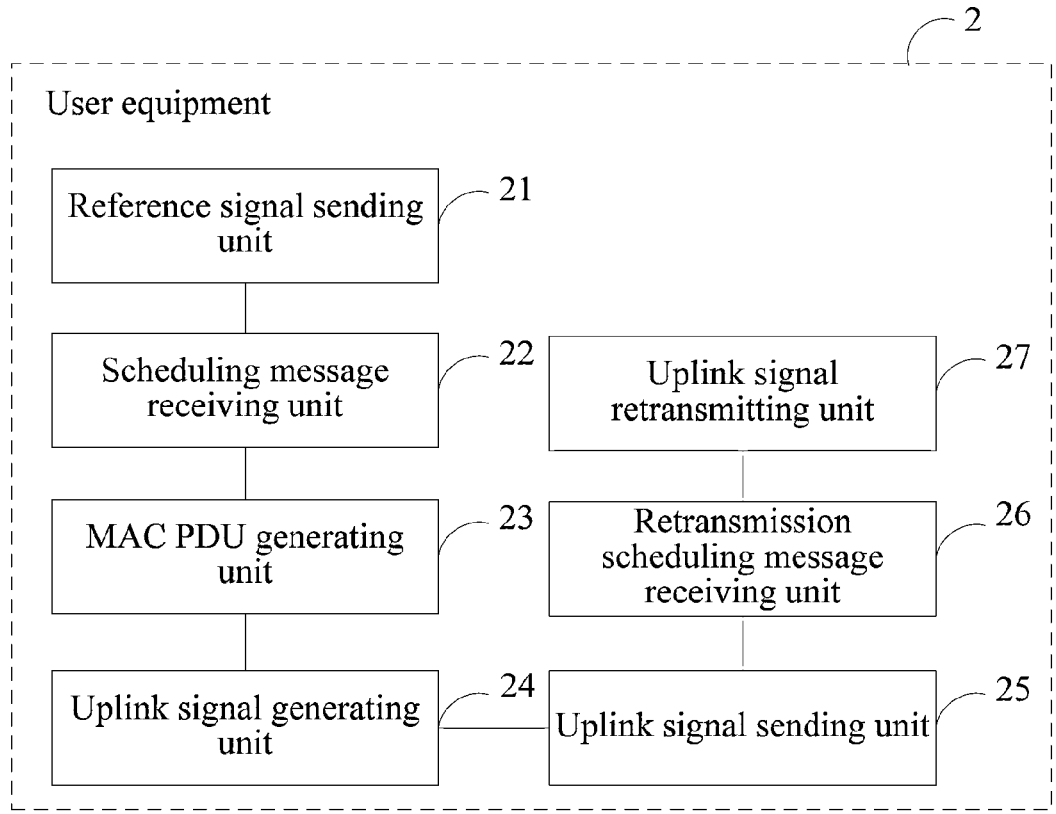
FIG. 9 is a structural composition block diagram of a user equipment according to another embodiment of the present invention.

FIG. 9 shows a composition structure of a user equipment according to another embodiment of the present invention. For ease of description, only a part relevant to the embodiment of the present invention is shown.

A user equipment 2 includes:

a reference signal sending unit 21, connected to a scheduling message receiving unit 22, and configured to send a sounding reference signal to a base station, so that the base station constructs a precoding matrix according to the sounding reference signal, and generates a first scheduling message according to the precoding matrix;

the scheduling message receiving unit 22, separately connected to the reference signal sending unit 21 and a MAC PDU generating unit 23, and configured to receive the first scheduling message sent by the base station, where the first scheduling message includes a layer mapping rule and the precoding matrix;

the MAC PDU generating unit 23, separately connected to the scheduling message receiving unit 22 and an uplink signal generating unit 24, and configured to generate at least one MAC packet data unit MAC PDU according to the first scheduling message, and send the MAC PDU, so that the multiple user equipments exchange the MAC PDUs;

the uplink signal generating unit 24, separately connected to the MAC PDU generating unit 23 and an uplink signal sending unit 25, and configured to generate the uplink signal after the MAC PDU is processed in various layers; and the uplink signal sending unit 25, connected to the uplink signal generating unit 24, and configured to send, by using an antenna, the uplink signal to the base station.

Further, the MAC PDU generating unit 23 is specifically configured to generate at least one MAC PDU, and send the MAC PDU to other user equipments; and receive MAC PDUs generated by the other user equipments.

Further, the uplink signal generating unit 24 is specifically configured to perform channel coding, rate matching, and modulation on the MAC PDU, so as to generate a corresponding codeword; perform layer mapping of a corresponding layer on the codeword according to the layer mapping rule included in the first scheduling message; and perform precoding on the layer according to a corresponding vector in the precoding matrix included in the first scheduling message, so as to obtain the uplink signal.

Further, the uplink signal sending unit 25 is specifically configured to: if the MAC PDU is generated, occupy a hybrid automatic repeat request process, to send, by using the antenna, the uplink signal to the base station; and if all the MAC PDUs are received, occupy the hybrid automatic repeat request process, to send, by using the antenna, the uplink signal to the base station.

Further, the user equipment 2 further includes:

a retransmission scheduling message receiving unit 26, separately connected to the uplink signal sending unit 25 and an uplink signal retransmitting unit 27, and configured to receive a retransmission scheduling message sent by the base station; and the uplink signal retransmitting unit 27, connected to the retransmission scheduling message receiving unit 26, and configured to send an uplink retransmission signal to the base station according to the retransmission scheduling message.

Further, the uplink signal retransmitting unit 27 is specifically configured to retransmit the uplink retransmission signal independently according to the retransmission scheduling message; and coordinate, according to the retransmission scheduling message, with the other user equipments to synchronously retransmit the uplink retransmission signal.

The user equipment provided in this embodiment may use the foregoing corresponding uplink MU-MIMO methods. For details, refer to relevant descriptions of the embodiments, corresponding to FIG. 1 and FIG. 3, of the uplink MU-MIMO methods, which are not described herein again.

It should be understood by persons of ordinary skill in the art that units included in the user equipment embodiment are only divided according to functional logic, but the present invention is not limited to the foregoing division as long as relevant functions can be implemented; in addition, specific names of functional units are just for distinguishing the functional units from each other, and the protection scope of the application is not limited thereto.

Figure 10:
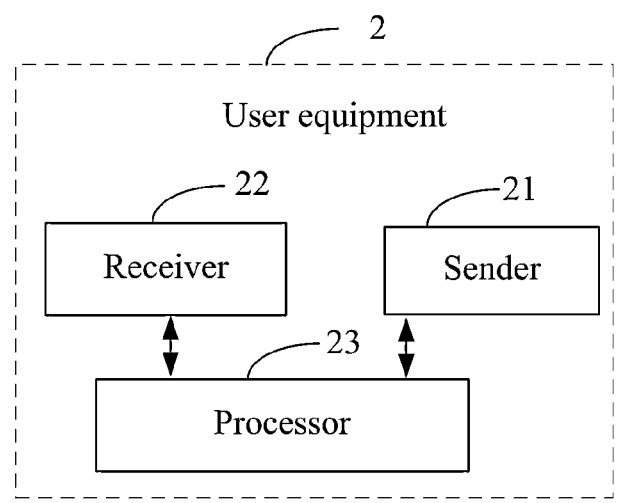
FIG. 10 is a structural composition block diagram of a user equipment according to another embodiment of the present invention.

FIG. 10 shows a composition structure of a user equipment according to another embodiment of the present invention. An access point device provided in the embodiment of the present invention may be used to implement the method of the embodiment corresponding to FIG. 3. For ease of description, only a part relevant to the embodiment of the present invention is shown. For specific technical details which are not disclosed, refer to the embodiment corresponding to FIG. 3.

A user equipment 2 includes:

a sender 21, connected to a processor 23, and configured to send a sounding reference signal to a base station, so that the base station constructs a precoding matrix according to the sounding reference signal, and generates a first scheduling message according to the precoding matrix; and send, by using an antenna, an uplink signal to the base station;

a receiver 22, connected to the processor 23, and configured to receive the first scheduling message sent by the base station, where the first scheduling message includes a layer mapping rule and the precoding matrix; and the processor 23, separately connected to the sender 21 and the receiver 22, and configured to generate at least one MAC packet data unit MAC PDU according to the first scheduling message, and send the MAC PDU, so that multiple user equipments exchange the MAC PDUs; and generate the uplink signal after the MAC PDU is processed in various layers.

Further, the processor 23 is further specifically configured to generate at least one MAC PDU;

the sender 21 is further specifically configured to send the MAC PDU to other user equipments; and the receiver 22 is further specifically configured to receive MAC PDUs generated by the other user equipments.

Further, the processor 23 is further specifically configured to perform channel coding, rate matching, and modulation on the MAC PDU, so as to generate a corresponding codeword; perform layer mapping of a corresponding layer on the codeword according to the layer mapping rule included in the first scheduling message; and perform precoding on the layer according to a corresponding vector in the precoding matrix included in the first scheduling message, so as to obtain the uplink signal.

Further, if the sender 21 is further specifically configured to: if the MAC PDU is generated, occupy a hybrid automatic repeat request process, to send, by using the antenna, the uplink signal to the base station; and if all the MAC PDUs are received, occupy the hybrid automatic repeat request process, to send, by using the antenna, the uplink signal to the base station.

Further, the receiver 22 is further configured to receive a retransmission scheduling message sent by the base station.

Further, the sender 21 is further configured to send an uplink retransmission signal to the base station according to the retransmission scheduling message.

Further, the sender 21 is further specifically configured to retransmit the uplink retransmission signal independently according to the retransmission scheduling message; and coordinate, according to the retransmission scheduling message, with the other user equipments to synchronously retransmit the uplink retransmission signal.

It should be understood by persons skilled in the art that the composition structure shown in FIG. 10 does not constitute a limitation to the user equipment, and may include components more or less than the components shown in the drawing, or some component combinations, or different component layouts.

All or a part of the steps of the method according to the embodiments of the present invention may be implemented by a program instructing relevant hardware. For example, implementation may be performed by using a computer run program. The program may be stored in a readable storage medium, such as, a random access memory, a magnetic disk, and an optical disc.

The foregoing embodiments are just used to describe the technical solutions of the present invention, instead of limiting the technical solutions; although the present invention is described in detail with reference to the foregoing embodiments, it should be understood by persons of ordinary skill in the art that they may still modify the technical solutions recorded about the embodiments, or make equivalent replacement of partial technical features; however, these modifications or replacement shall not make the nature of corresponding technical solutions depart from the spirit and scope of the technical solutions of the embodiments of the application.

What is claimed is:

1. An uplink MU-MIMO method, wherein the method comprises:

receiving, by a base station, sounding reference signals sent by multiple user equipments, wherein the multiple user equipments meet a short-distance transmission condition;

constructing, by the base station, a precoding matrix according to the received sounding reference signals;

generating, by the base station, a first scheduling message according to the precoding matrix;

sending, by the base station, the first scheduling message to the multiple user equipments, so as to schedule at least one user equipment in the multiple user equipments to generate at least one MAC packet data unit (MAC PDU), and exchange the MAC PDUs between the multiple user equipments by using a short-distance transmission technology; and receiving, by the base station after a preset fixed time, uplink signals sent by the multiple user equipments, wherein the uplink signals are uplink signals generated after the multiple user equipments separately process the MAC PDUs.

2. The method according to claim 1, wherein after the receiving, by the base station after a preset fixed time, uplink signals sent by the multiple user equipments, the method further comprises:

decoding, by the base station, the uplink signals to obtain a codeword, and sending the codeword into a hybrid automatic repeat request process corresponding to the user equipment generating the MAC PDU.

3. The method according to claim 2, wherein after the decoding, by the base station, the uplink signals to obtain a codeword, and sending the codeword into a hybrid automatic repeat request process corresponding to the user equipment generating the MAC PDU, the method further comprises:

checking, by the base station, the codeword, and if the codeword is incorrect, sending a retransmission scheduling message to the user equipment generating the MAC PDU or the multiple user equipments, so as to obtain an uplink retransmission signal uploaded by the user equipment.

4. The method according to claim 3, wherein after the checking, by the base station, the codeword, and if the codeword is incorrect, sending a retransmission scheduling message to the user equipment generating the MAC PDU or the multiple user equipments, the method further comprises:

receiving, by the base station, an uplink retransmission signal sent by one or more user equipments.

5. An uplink MU-MIMO method, wherein the method comprises:

sending, by a user equipment, a sounding reference signal to a base station, so that the base station constructs a precoding matrix according to the sounding reference signal, and generates a first scheduling message according to the precoding matrix;

receiving, by the user equipment, the first scheduling message sent by the base station, wherein the first scheduling message comprises a layer mapping rule and the precoding matrix;

generating, by the user equipment, at least one MAC packet data unit (MAC PDU) according to the first scheduling message, and sending the MAC PDU, so that multiple user equipments exchange the MAC PDUs;

generating, by the user equipment, an uplink signal after the MAC PDU is processed in various layers; and sending, by the user equipment by using an antenna, the uplink signal to the base station.

6. The method according to claim 5, wherein the generating, by the user equipment, at least one MAC packet data unit (MAC PDU) according to the first scheduling message, and sending the MAC PDU, so that the multiple user equipments exchange the MAC PDUs comprises:
   generating, by the user equipment, at least one MAC PDU, and sending the MAC PDU to other user equipments; and/or
   receiving, by the user equipment, MAC PDUs generated by the other user equipments.

7. The method according to claim 5, wherein the receiving, by the user equipment, the first scheduling message sent by the base station, wherein the first scheduling message comprises a layer mapping rule and the precoding matrix comprises:
   performing, by the user equipment, channel coding, rate matching, and modulation on the MAC PDU, so as to generate a corresponding codeword;
   performing, by the user equipment, layer mapping of a corresponding layer on the codeword according to the layer mapping rule comprised in the first scheduling message; and
   using, by the user equipment according to the precoding matrix comprised in the first scheduling message, a corresponding precoding vector to perform precoding on the layer, so as to obtain the uplink signal.

8. The method according to claim 5, wherein the sending, by the user equipment by using an antenna, the uplink signal to the base station comprises:
   if the user equipment generates the MAC PDU, occupying, by the user equipment, a hybrid automatic repeat request process, to send, by using the antenna, the uplink signal to the base station; and
   if the user equipment receives all the MAC PDUs, occupying, by the user equipment, the hybrid automatic repeat request process, to send, by using the antenna, the uplink signal to the base station.

9. The method according to claim 5, wherein after the sending, by the user equipment by using an antenna, the uplink signal to the base station, the method further comprises:
   receiving, by the user equipment, a retransmission scheduling message sent by the base station; and
   sending, by the user equipment, an uplink retransmission signal to the base station according to the retransmission scheduling message.

10. The method according to claim 9, wherein the sending, by the user equipment, an uplink retransmission signal to the base station according to the retransmission scheduling message comprises:
   retransmitting, by the user equipment alone, the uplink retransmission signal according to the retransmission scheduling message; or
   coordinating, by the user equipment according to the retransmission scheduling message, with the other user equipments to synchronously retransmit the uplink retransmission signal.

11. A base station, wherein the base station comprises:
   a receiver, connected to a processor, and configured to receive sounding reference signals sent by multiple user equipments, wherein the multiple user equipments meet a short-distance transmission condition; and receive, after a preset fixed time, uplink signals sent by the multiple user equipments, wherein the uplink signals are uplink signals generated after the multiple user equipments separately process a MAC PDUs;
   the processor, separately connected to the receiver and a sender, and configured to construct a precoding matrix according to the received sounding reference signals; and generate a first scheduling message according to the precoding matrix; and
   the sender, connected to the processor, and configured to send the first scheduling message to the multiple user equipments, so as to schedule at least one user equipment in the multiple user equipments to generate at least one MAC packet data unit (MAC PDU), and exchange the MAC PDUs between the multiple user equipments by using a short-distance transmission technology.

12. The base station according to claim 11, wherein the processor is further configured to decode the uplink signals to obtain a codeword, and send the codeword into a hybrid automatic repeat request process corresponding to the user equipment generating the MAC PDU.

13. The base station according to claim 12, wherein the processor is further configured to check the codeword; and
   the sender is further configured to: if the codeword is incorrect, send a retransmission scheduling message to the user equipment generating the MAC PDU, or the multiple user equipments, so as to obtain an uplink retransmission signal.

14. The base station according to claim 13, wherein the receiver is further configured to receive the uplink retransmission signal sent by one or more user equipments.

15. A user equipment, wherein the user equipment comprises:
   a sender, connected to a processor, and configured to send a sounding reference signal to a base station, so that the base station constructs a precoding matrix according to the sounding reference signal, and generates a first scheduling message according to the precoding matrix; and send, by using an antenna, an uplink signal to the base station;
   a receiver, connected to the processor, and configured to receive the first scheduling message sent by the base station, wherein the first scheduling message comprises a layer mapping rule and the precoding matrix; and
   the processor, separately connected to the sender and the receiver, and configured to generate at least one MAC packet data unit (MAC PDU) according to the first scheduling message, and send the MAC PDU, so that the multiple user equipments exchange the MAC PDUs; and generate the uplink signal after the MAC PDU is processed in various layers.

16. The user equipment according to claim 15, wherein the processor is further specifically configured to generate at least one MAC PDU;
   the sender is further specifically configured to send the MAC PDU to other user equipments; and
   the receiver is further specifically configured to receive MAC PDUs generated by the other user equipments.

17. The user equipment according to claim 15, wherein the processor is further specifically configured to perform channel coding, rate matching, and modulation on the MAC PDU, so as to generate a corresponding codeword; perform layer mapping of a corresponding layer on the codeword according to the layer mapping rule comprised in the first scheduling message; and perform precoding on the layer according to a corresponding vector in the precoding matrix comprised in the first scheduling message, so as to obtain the uplink signal.

18. The user equipment according to claim 15, wherein the sender is further specifically configured to: if the MAC PDU is generated, occupy a hybrid automatic repeat request process, to send, by using the antenna, the uplink signal to the base station; and if all the MAC PDUs are received, occupy the hybrid automatic repeat request process, to send, by using the antenna, the uplink signal to the base station.

19. The user equipment according to claim 15, wherein the receiver is further configured to receive a retransmission scheduling message sent by the base station; and the sender is further configured to send an uplink retransmission signal to the base station according to the retransmission scheduling message.

* * * * *